United States Patent
Hong (10) Patent No.: US 7,417,492 B2
(45) Date of Patent: Aug. 26, 2008

(54) REGULATOR

(75) Inventor: Byung-Il Hong, Chungcheongbuk-do (KR)

(73) Assignee: MagnaChip Semiconductor, Ltd., Chungcheongbuk-do (KR)

( * ) Notice: Subject to any disclaimer, the term of this patent is extended or adjusted under 35 U.S.C. 154(b) by 77 days.

(21) Appl. No.: 11/453,982

(22) Filed: Jun. 16, 2006

(65) Prior Publication Data

US 2006/0284674 A1    Dec. 21, 2006

(30) Foreign Application Priority Data

Jun. 17, 2005    (KR) .................. 10-2005-0052370

(51) Int. Cl.
*H03G 3/30*    (2006.01)
(52) U.S. Cl. ...................... 327/538; 330/254
(58) Field of Classification Search ........................ None
See application file for complete search history.

(56) References Cited

U.S. PATENT DOCUMENTS

| | | | |
|---|---|---|---|
| 6,380,791 B1* | 4/2002 | Gupta et al. | 327/382 |
| 6,897,713 B1* | 5/2005 | Nguyen et al. | 327/541 |
| 7,005,922 B2* | 2/2006 | Oshima et al. | 330/278 |
| 2004/0075496 A1* | 4/2004 | Ito et al. | 330/136 |

* cited by examiner

*Primary Examiner*—N. Drew Richards
*Assistant Examiner*—Terry L Englund
(74) *Attorney, Agent, or Firm*—Morgan, Lewis & Bockius LLP (57) ABSTRACT

A regulator includes a digital voltage detection unit for generating a digital voltage detection signal by detecting a digital value of a voltage level of an input voltage; a variable gain amplifying unit for amplifying the input voltage in an amplifying ratio according to a gain control signal; and a gain control unit for receiving the digital voltage detection signal to thereby generate the gain control signal.

6 Claims, 7 Drawing Sheets

REGULATOR

FIELD OF THE INVENTION

The present invention relates to a regulating circuit for use in a semiconductor device or a general electric circuit; and, more particularly, to a regulating circuit for generating a stable voltage even when an external input voltage used as a regulating reference signal is unstable.

DESCRIPTION OF RELATED ARTS

Figure 1A:
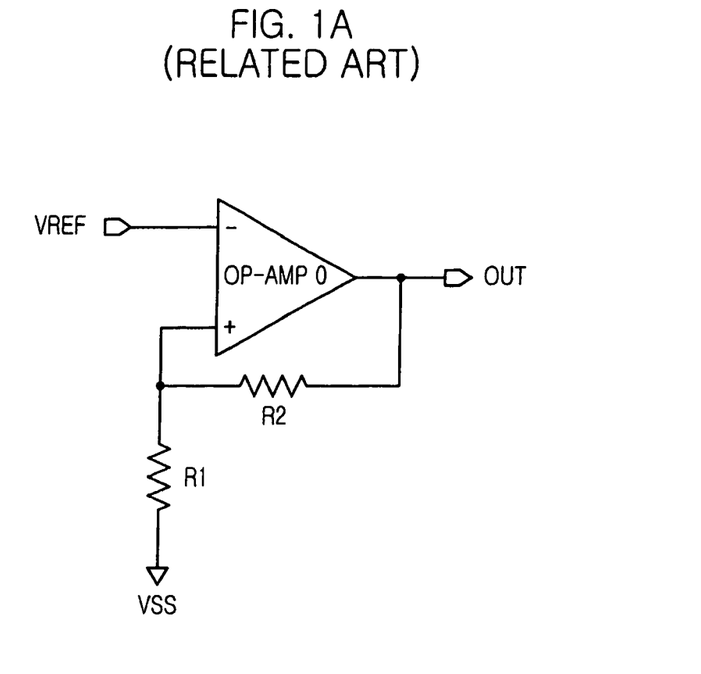
FIGS. 1A and 1B are schematic circuit diagrams respectively showing conventional regulators.
Figure 1B:
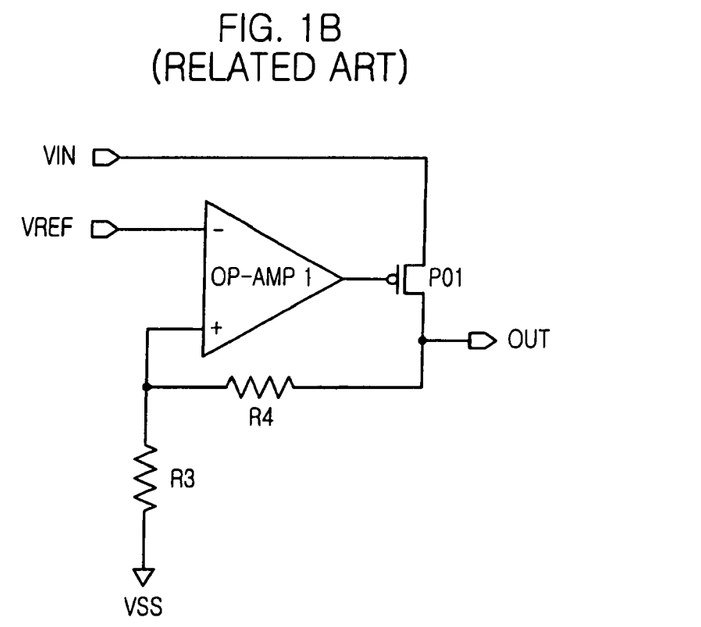

FIGS. 1A and 1B are schematic circuit diagrams respectively showing conventional regulators.

Referring to FIG. 1A, as a basic regulating circuit, two bias resistors R1 and R2 divide a voltage level of an output terminal voltage OUT. An operational amplifier OP-AMP0 compares an input reference voltage VREF with a divided voltage in order to output the comparison result, wherein the divided voltage is generated by dividing the output terminal voltage OUT with the bias resistors R1 and R2.

Referring to FIG. 1B, a regulator regulates an external input voltage to output the regulated signal.

In comparison with the basic regulator shown in FIG. 1A, a p-type metal oxide semiconductor (PMOS) transistor PO1 is coupled to the output terminal. A source of the PMOS transistor PO1 receives an input voltage VIN and a drain of the PMOS transistor PO1 is connected to a second bias resistor R4 and an output voltage OUT. An operation of the PMOS transistor PO1 is determined by an output signal of an operational amplifier OP-AMP1.

An operation of the regulator shown in FIG. 1B is described below.

The operational amplifier OP-AMP1 compares the reference voltage VREF with a divided voltage which is generated by dividing the output voltage OUT by bias resistors R3 and R4. If the reference voltage VREF is greater than the divided voltage, the output of the operational amplifier OP-AMP1 is in an "L" state so that the PMOS transistor PO1 is turned on and, thus, a voltage level of the output voltage OUT is increased.

On the other hand, when a turned-on period of the PMOS transistor PO1 is increased or a ripple is generated in the input voltage VIN so that the voltage level of the output voltage OUT is increased, the increased output voltage OUT increases the divided voltage. Therefore, the divided voltage becomes greater than the reference voltage VREF.

Accordingly, the output of the operational amplifier OP-AMP1 becomes in an "H" state so that the PMOS transistor PO1 is turned off and, thus, the output voltage OUT is discharged through the bias resistors R3 and R4. By feedback of this process, the input voltage VIN is regulated and the regulated voltage is outputted as the output voltage.

However, according to the related art, the output voltage OUT is proportionally outputted according to an input of an unstable reference voltage. Therefore, a stable voltage should be inputted in order to generate a stable regulated voltage.

SUMMARY OF THE INVENTION

It is, therefore, an object of the present invention to provide a regulator for correctly performing a regulating operation without a help of a reference voltage.

In accordance with an aspect of the present invention, there is provided a regulator, including: a digital voltage detection unit for generating a digital voltage detection signal by detecting a digital value of a voltage level of an input voltage; a variable gain amplifying unit for amplifying the input voltage in an amplifying ratio according to a gain control signal; and a gain control unit for receiving the digital voltage detection signal to thereby generate the gain control signal.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE INVENTION

Hereinafter, a regulator in accordance with the present invention will be described in detail referring to the accompanying drawings.

Figure 2:
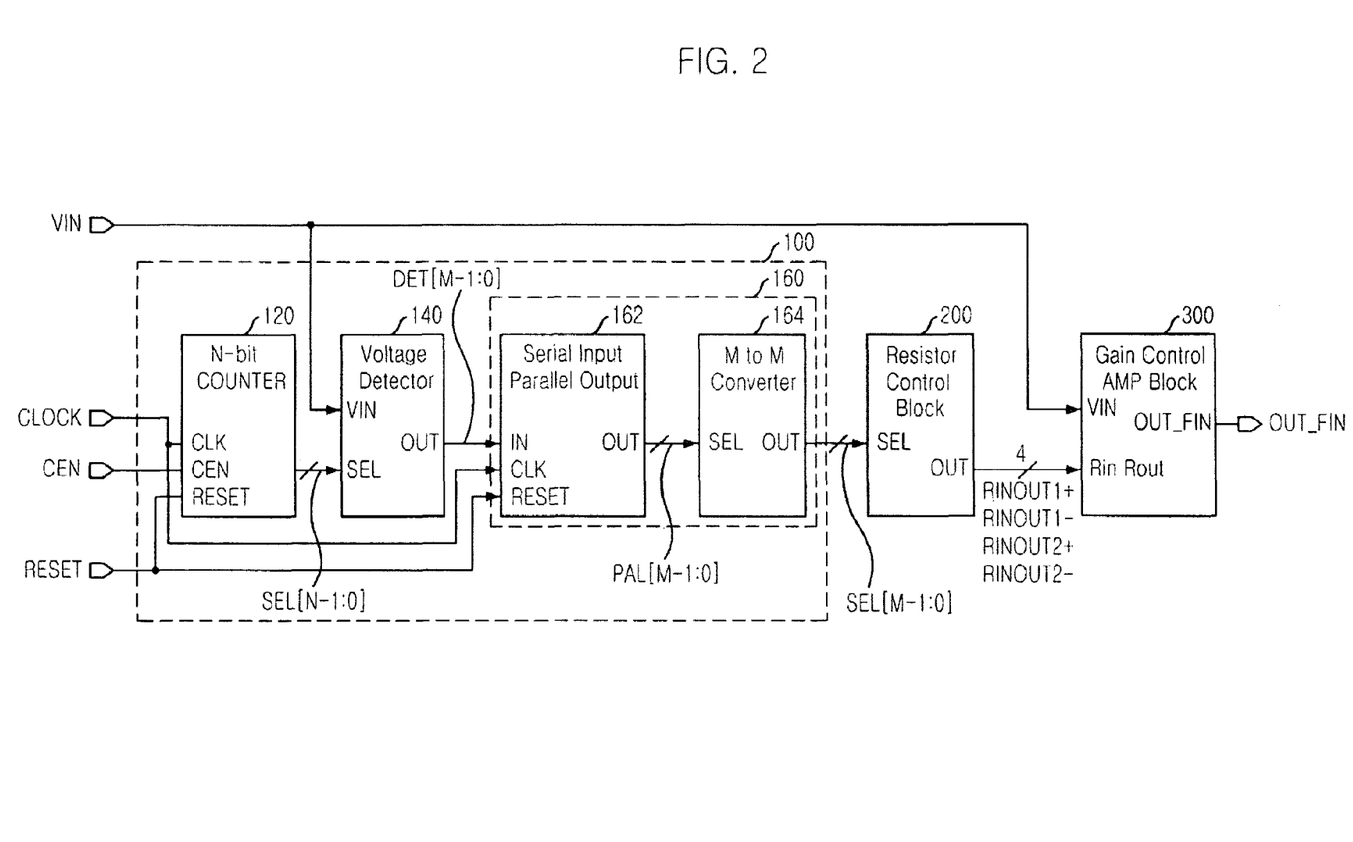
FIG. 2 is a block diagram showing a regulator in accordance with a preferred embodiment of the present invention.

FIG. 2 is a block diagram showing a regulator in accordance with a preferred embodiment of the present invention.

As shown, the regulator includes a digital voltage detection unit 100, a gain control unit 200 and a variable gain amplifying unit 300.

The digital voltage detection unit 100 generates a digital voltage detection signal by detecting a voltage level of an input voltage as a digital value. The variable gain amplifying unit 300 amplifies an input voltage according to an amplifying ratio determined by a gain control signal. The gain control unit 200 receives the digital voltage detection signal to generate the gain control signal.

In detail, the digital voltage detection unit 100 includes a counter 120, a voltage detector 140 and a serial input parallel output (SIPO) block 160.

The counter 120 counts a predetermined operational clock. The voltage detector 140 compares the input voltage with a comparison voltage which is increased according to a counting number of the counter 120 and, then, outputs the comparison result as a logic value. The SIPO block 160 receives the output logic value stream of the voltage detector 140 to generate the digital voltage detection signal, wherein the output logic value stream is a serial digital data and the digital voltage detection signal is a parallel digital data.

The SIPO block 160 includes an SIPO circuit 162 and an M-M converter 164.

The SIPO circuit 162 converts the serial digital stream (DET[M-1:0]) outputted from the voltage detector 140 shown in FIG. 5 to a parallel digital data as shown in the Input column of Table. 1 shown below. The M-M converter 164 converts the Input data to the Output data (SEL[M-1:0]) as shown in Table. 1.

TABLE. 1

| | Input | | | | | | | | | Output | | | | | | | |
|---|---|---|---|---|---|---|---|---|---|---|---|---|---|---|---|---|---|
| PAL [M - 1] | PAL [M - 2] | PAL [M - 3] | PAL [M - 4] | ... | PAL [3] | PAL [2] | PAL [1] | PAL [0] | SEL [M - 1] | SEL [M - 2] | SEL [M - 3] | SEL [M - 4] | ... | SEL [3] | SEL [2] | SEL [1] | SEL [0] |
| 1 | 1 | 1 | 1 | ... | 1 | 1 | 1 | 1 | 0 | 0 | 0 | 0 | ... | 0 | 0 | 0 | 1 |
| 1 | 1 | 1 | 1 | ... | 1 | 1 | 1 | 0 | 0 | 0 | 0 | 0 | ... | 0 | 0 | 1 | 0 |
| 1 | 1 | 1 | 1 | ... | 1 | 1 | 0 | 0 | 0 | 0 | 0 | 0 | ... | 0 | 1 | 0 | 0 |
| 1 | 1 | 1 | 1 | ... | 1 | 0 | 0 | 0 | 0 | 0 | 0 | 0 | ... | 1 | 0 | 0 | 0 |
| 1 | 1 | 1 | 1 | ... | 0 | 0 | 0 | 0 | 0 | 0 | 0 | 0 | ... | 0 | 0 | 0 | 0 |
| ... | ... | ... | ... | ... | ... | ... | ... | ... | ... | ... | ... | ... | ... | ... | ... | ... | ... |
| 1 | 0 | 0 | 0 | ... | 0 | 0 | 0 | 0 | 1 | 0 | 0 | 0 | ... | 0 | 0 | 0 | 0 |
| 0 | 0 | 0 | 0 | ... | 0 | 0 | 0 | 0 | 0 | 0 | 0 | 0 | ... | 0 | 0 | 0 | 0 |

Figure 3:
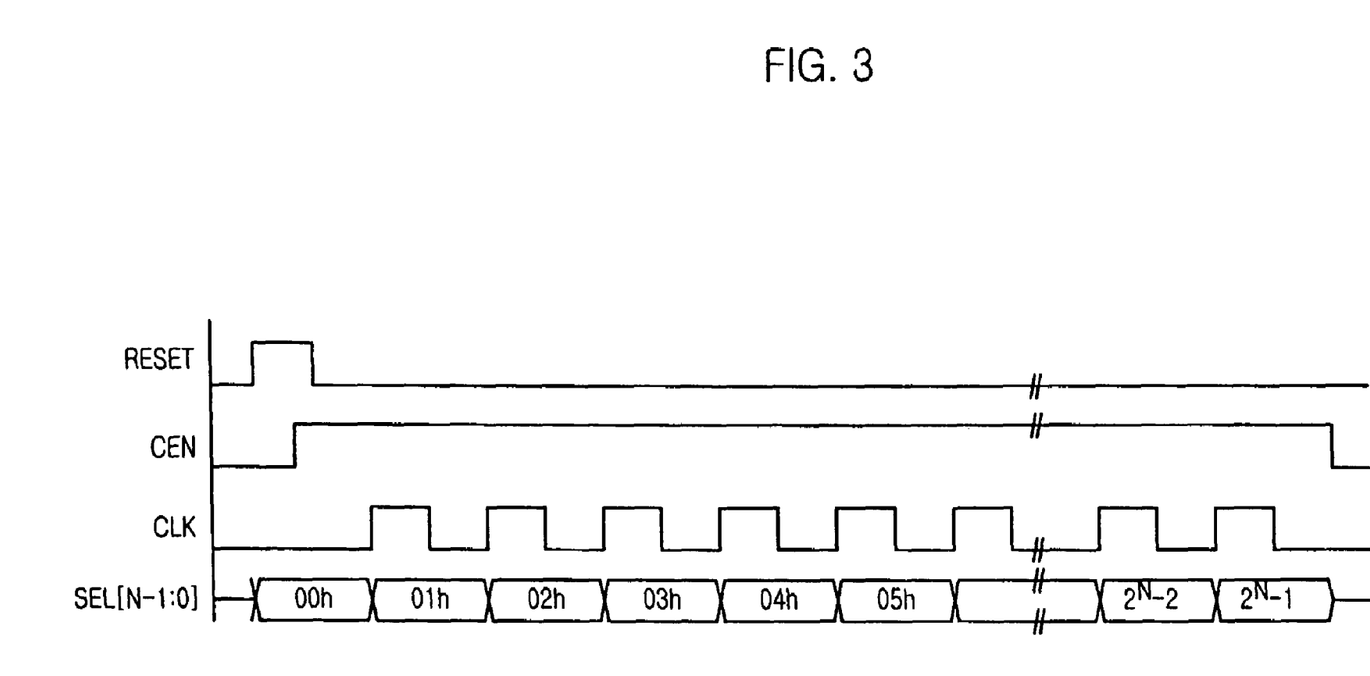
FIG. 3 is a timing diagram showing an operation of a N-bit counter shown in FIG. 2.

FIG. 3 is a timing diagram showing an operation of the N-bit counter 120 shown in FIG. 2.

The N-bit counter 120 is initialized by a system reset signal RESET and is operated according to a counter enable signal CEN. The counting operation is performed in response to a count clock CLK so that an N-bit output (SEL[N-1:0]) is generated. The N-bit output SEL[N-1:0] is used as an input of the voltage detector 140 to thereby control variable resistors R5 and R6 included in the voltage detector 140.

Figure 4:
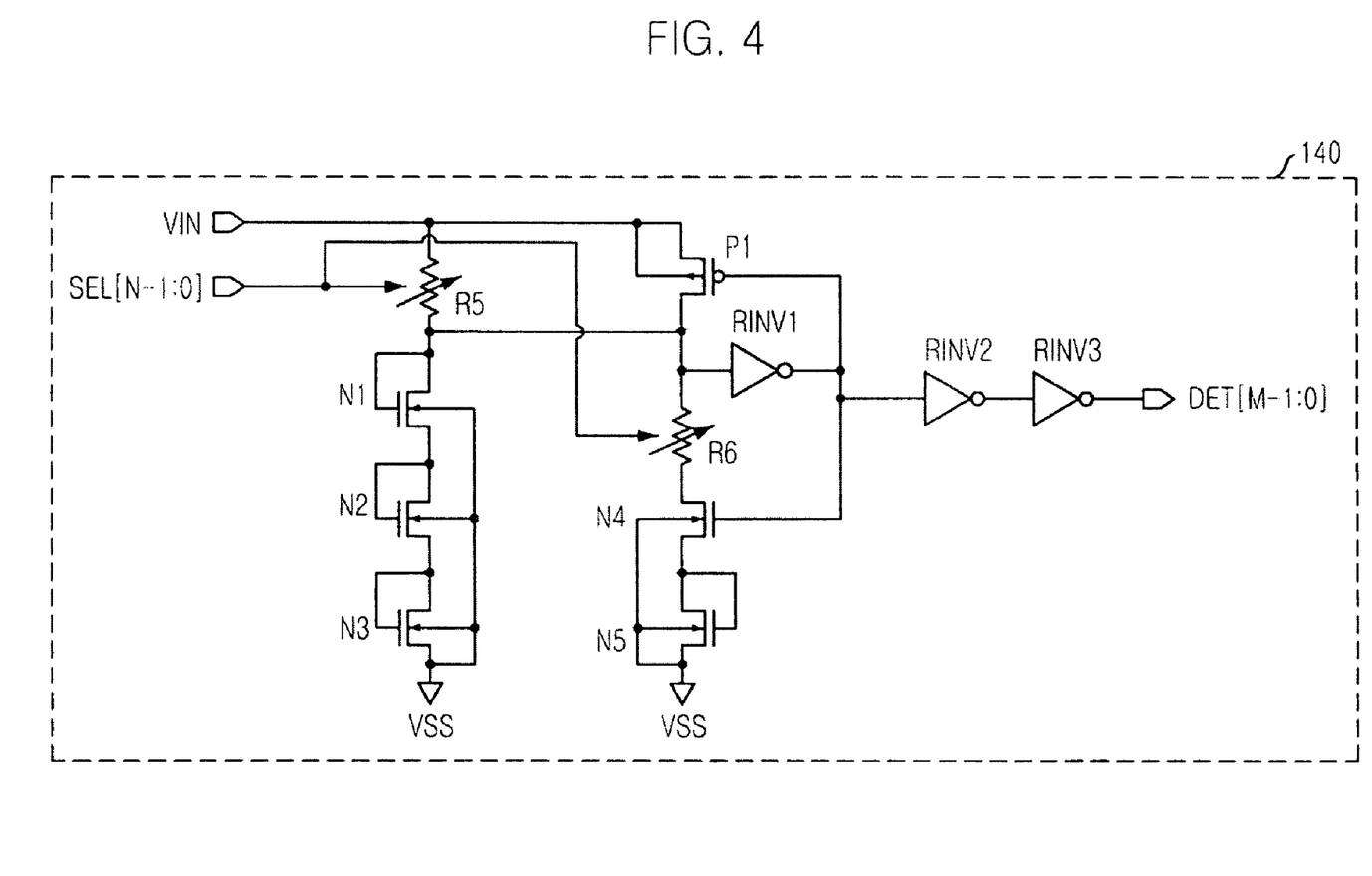
FIG. 4 is a schematic circuit diagram showing a voltage detector shown in FIG. 2.

FIG. 4 is a schematic circuit diagram showing the voltage detector 140 shown in FIG. 2.

As shown, the voltage detector 140 includes first to fifth n-type metal oxide semiconductor (NMOS) transistors N1 to N5, a p-type metal oxide semiconductor (PMOS) transistor P1, first to third inverters RINV1 to RINV3 and first and second variable resistors R5 and R6.

According to the N-bit control signal SEL[N-1:0], the first and second variable resistors R5 and R6 are adjusted when the input voltage VIN is inputted so that an output voltage DET [M-1:0] whose voltage level is corresponded to the N-bit control signal SEL[N-1:0] is generated.

Figure 5:
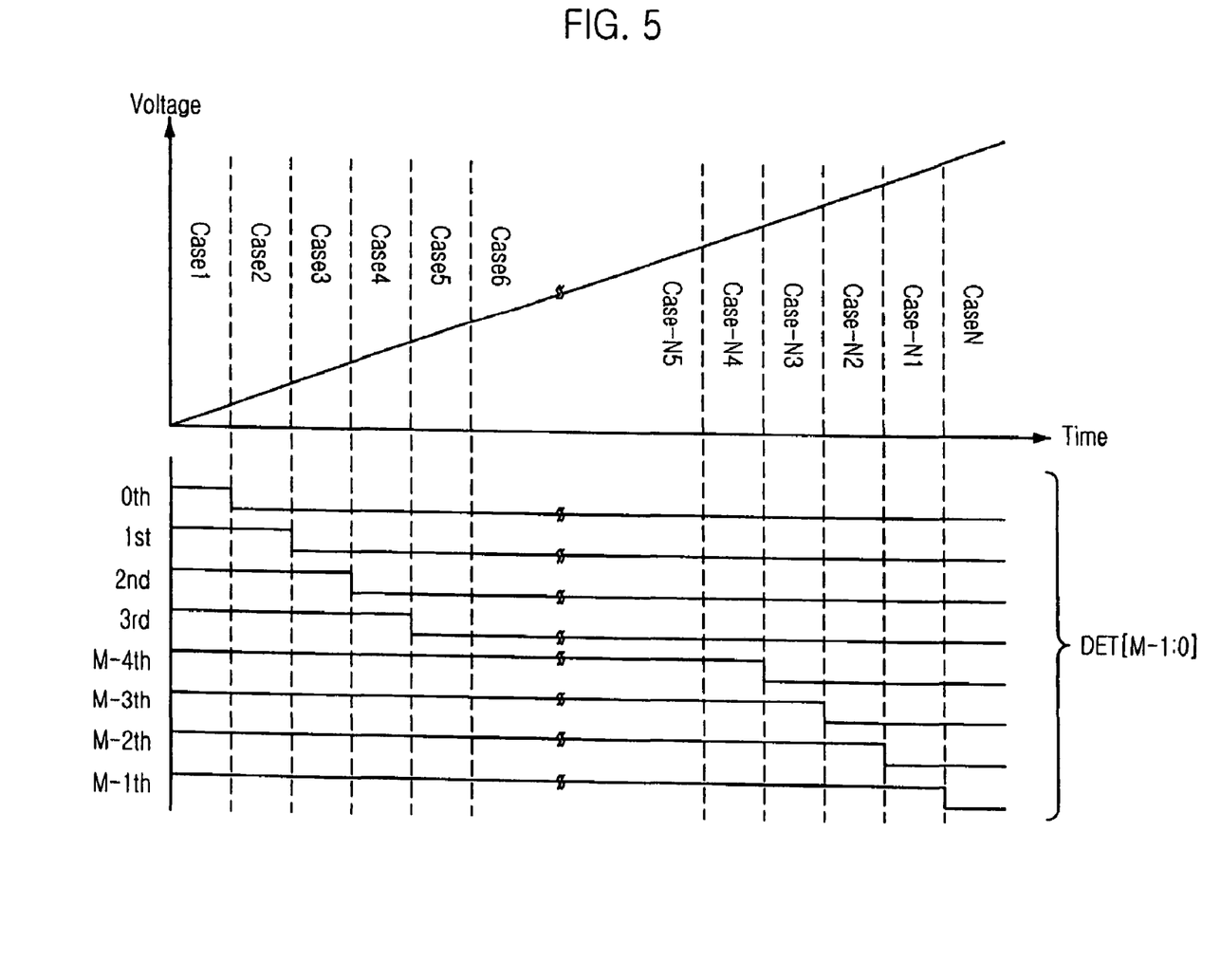
FIG. 5 is a wave diagram showing an operation of the voltage detector shown in FIG. 4.

FIG. 5 is a wave diagram showing an operation of the voltage detector 140 shown in FIG. 4.

Since the input voltage VIN exists at one of the periods (case1 to caseN) in the voltage-time graph, the output voltages (DET0 to DET M-1) of the voltage detector 140 are respectively generated as 0th to M-1th by adjusting the variable resistors corresponding to the periods case1 to caseN.

For instance, in case that the N-bit counter 120 is an 8-bit counter and the input voltage VIN corresponds to the Case4, an 8-bit serial data stream output value becomes "LLLHH-HHH" (LSB to MSB) according to the variable resistor adjustment based on a counted value from 00 h to 07 h.

Figure 6:
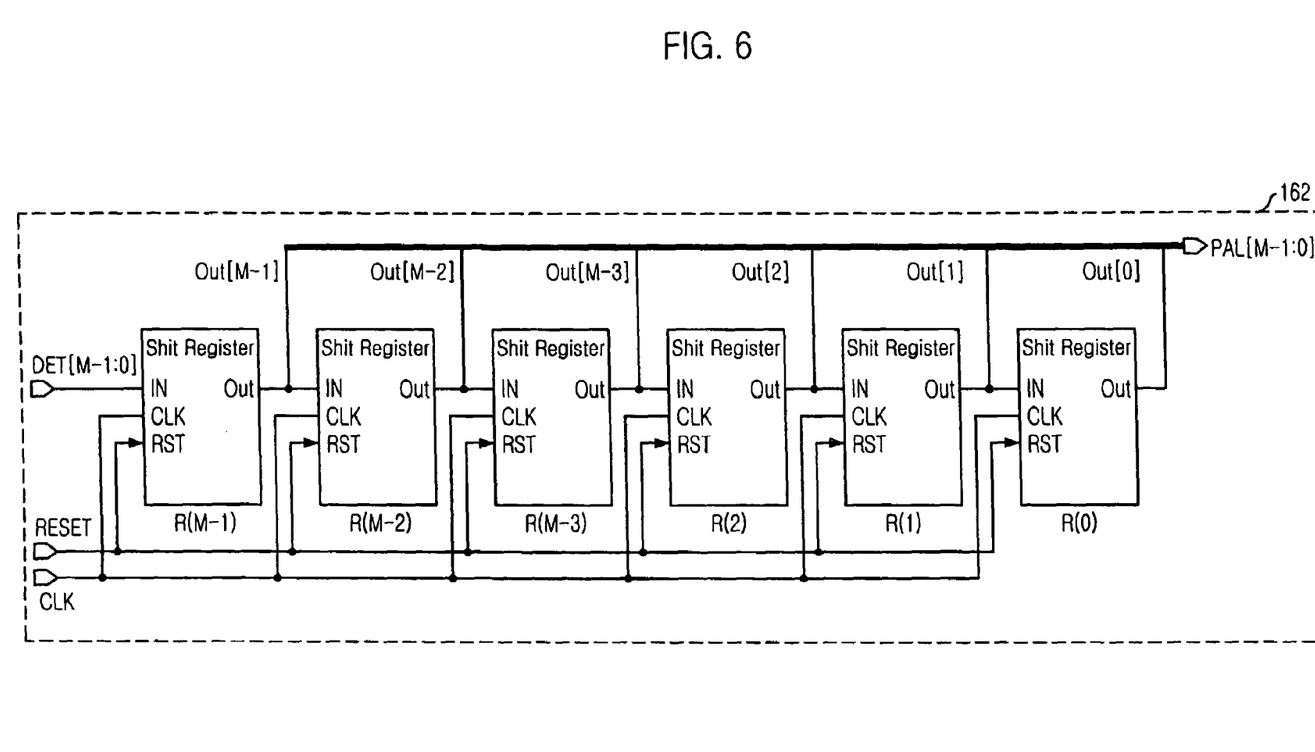
FIG. 6 is a block diagram showing a SIPO circuit shown in FIG. 2.

FIG. 6 is a block diagram showing the SIPO circuit 162 shown in FIG. 2.

As shown, the SIPO circuit 162 includes a plurality of shift registers for shifting a serial signal inputted through an input terminal IN one by one according to the clock CLK. After shifting M-times, a conversion to an M-bit parallel digital data is completed. For instance, the above-mentioned 8-bit serial stream data "LLLHHHHH" is converted to "HHH-HHLLL" (MSB to LSB) through the SIPO circuit 162.

According to the preferred embodiment of the present invention, the output of the SIPO circuit 162, i.e., PAL[M-1: 0], is an M-bit data divided into "H" section and "L" section as shown in Table. 1. The M-M converter 164 converts the output of the SIPO circuit 162 to the output data SEL[M-1:0] by setting the boundary bit between the "H" section and the "L" section to "H" and setting the other bits to "L".

Figure 7:
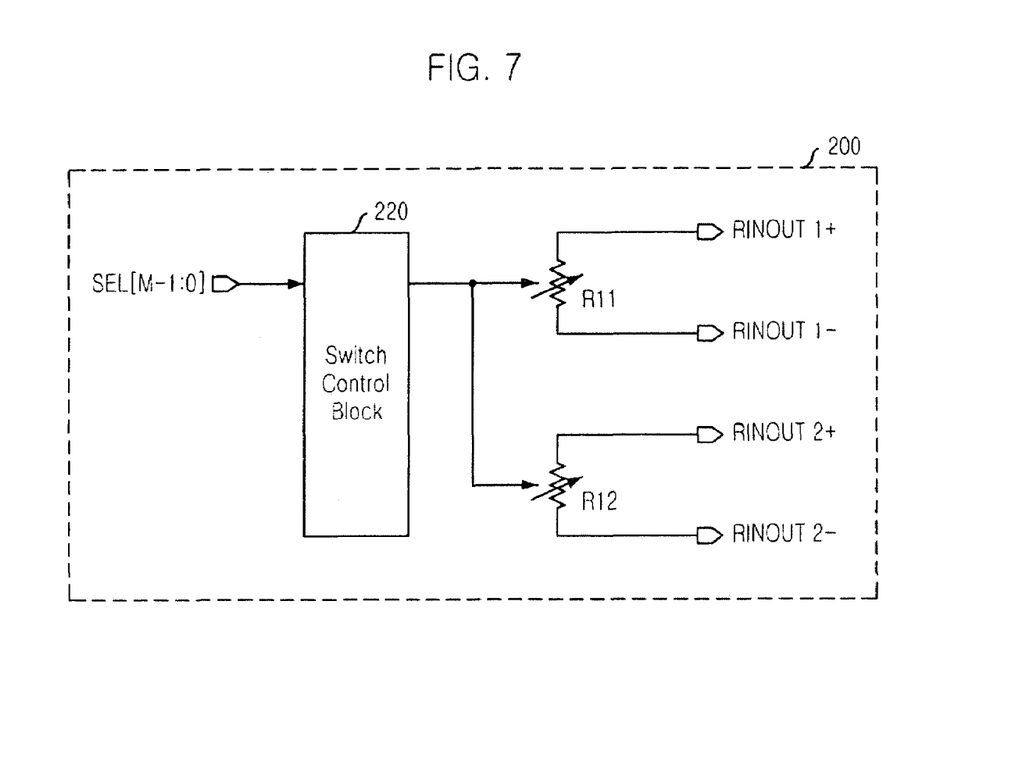
FIG. 7 is a block diagram showing a gain control unit shown in FIG. 2.

FIG. 7 is a block diagram showing the gain control unit 200 shown in FIG. 2.

Based on the M-bit output of the M-M converter 164, a target value and an error of a corresponding voltage can be obtained. For correcting the error, a switch control block 220 is included in order to adjust a resistance of a variable resistor. For this purpose, the switch control block 220 calculates an adjustment resistance to thereby adjust variable resistors R11 and R12 to the adjustment resistance. The process of the calculation of the adjustment resistance will be described later.

Figure 8:
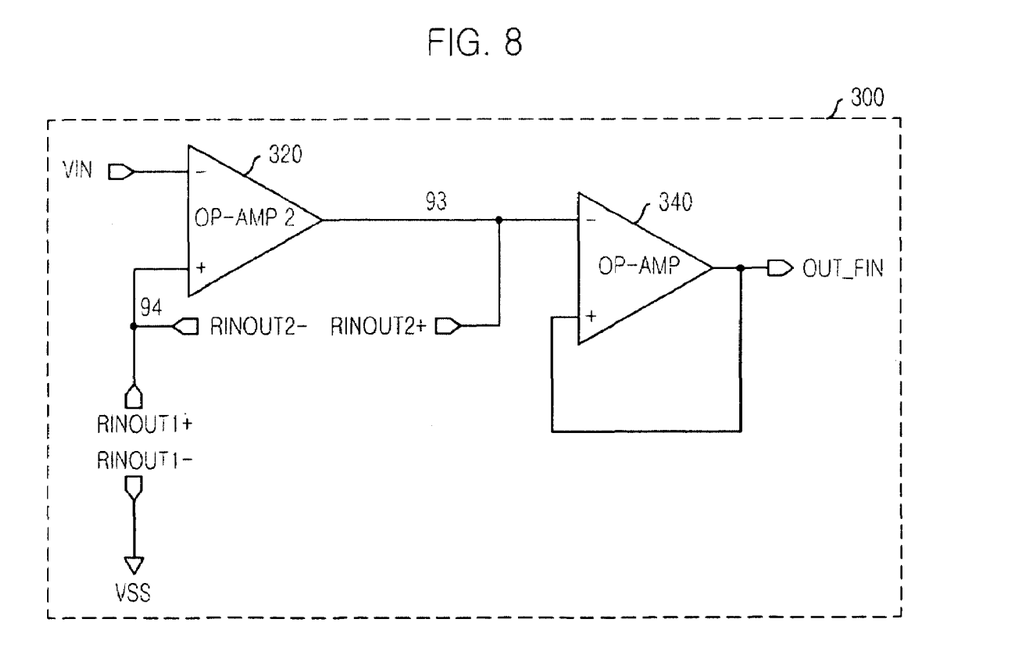
FIG. 8 is a schematic circuit diagram showing a variable gain amplifying unit shown in FIG. 2.

FIG. 8 is a schematic circuit diagram showing the variable gain amplifying unit 300 shown in FIG. 2.

A main operational amplifier 320 is connected to terminals of the variable resistors R11 and R12 included in the gain control unit 200. A RINOUT1+ terminal and a RINOUT1− terminal are respectively coupled to two terminals of the variable resistor R11. Similarly, a RINOUT2+ terminal and a RINOUT2− terminal are respectively coupled to two terminals of the variable resistor R12.

A second operational amplifier 340 has a structure of a unit gain operational amplifier to be used as a unit gain buffer. The second operational amplifier 340 serves to more stably output a signal outputted from a node 93. At an ideal case, an output node OUT_FIN has a same voltage level with the inverted input node (93) of the unit gain operational amplifier 340. If a sufficient capacity of the output node voltage is not required, the unit gain operational amplifier 340 may be omitted.

Although it was explained that the variable resistors R11 and R12 are included in the gain control unit 200, it is also right to explain that the variable resistors R11 and R12 are included in the variable gain amplifying unit 300.

Further, since only one of the variable resistors R11 and R12 can be used to adjust a variable gain as described below, one of the variable resistors R11 and R12 can be replaced with a fixed resistor. Therefore, it is possible to cut down expenses by replacing one of the variable resistors R11 and R12 with a fixed resistor. However, it is also possible to use both variable resistors R11 and R12 for a gain adjustment convenience and for increasing a range of a gain adjustment.

An operation of the regulator, i.e., a regulation operation to an input voltage by adjusting first and second variable resistors of the gain control unit, is described below.

A voltage level at the node 93 follows a first equation shown below according to an amplification formula of the main operational amplifier.

$$VNODE93 = VIN \times \left(1 + \frac{R12}{R11}\right) \qquad \text{[Eq. 1]}$$

Since the node 93 and the output node OUT_FIN have the same voltage level due to the buffering operation of the unit gain operational amplifier, a voltage level of the output node OUT_FIN follow a second equation shown below.

$$VOUT = VIN \times \left(1 + \frac{R12}{R11}\right) \quad \text{[Eq. 2]}$$

However, if the input voltage VIN has an error, the output voltage also has an error following a third equation shown below.

$$V_{OUT\_ERROR} = V_{IN\_ERROR} \times \left(1 + \frac{R12}{R11}\right) \quad \text{[Eq. 3]}$$

As shown in the third equation, the error of the output voltage, i.e., $V_{OUT-ERROR}$, has a value of multiplying the error of input voltage, i.e., $V_{IN-ERROR}$, by a gain value of the main operational amplifier. Therefore, the error increases in proportion to the gain value. In accordance with the present invention, a gain controlling variable resistor is adjusted for correcting the error. An equation related to the adjustment of the variable resistor is described below.

Herein, for a brief explanation of detecting an error ratio of the input voltage VIN in comparison with a reference value and correcting the error, it is assumed that the input voltage has 99%-value in comparison with a target value and a target gain value is 6. In this case, for adjusting a voltage by changing the resistance of the first variable resistor R11 and fixing the resistance of the second variable resistor R12, the output voltage follows a fourth equation shown below.

$$VOUT = VIN \times \left(1 + \frac{R12}{R11}\right) \quad \text{[Eq. 4]}$$
$$= 0.99 VIN \times \left(1 + \frac{R12}{R1'}\right),$$
$$\left(1 + \frac{R12}{R11}\right) = 0.99 \times \left(1 + \frac{R12}{R1'}\right)$$

Since the target gain value is 6 and, thus, R12/R11=5, the input error can be corrected by adjusting the first variable resistor R11 to R1' as in a fifth equation shown below.

$$R12 = 5R11 \quad \text{[Eq. 5]}$$
$$R1' = \frac{99 \times 5}{501} R11$$
$$6 = \left(1 + \frac{R12}{R11}\right) = \left(1 + \frac{5R11}{R11}\right) = 0.99\left(1 + \frac{R12}{R1'}\right)$$
$$= 0.99\left(1 + \frac{5 \times R11}{\frac{99 \times 5}{501} \times R11}\right)$$

As a result, the input error of −1% is corrected as above-mentioned. In this manner, an input error of +1% (the input voltage has 101%-value of the target value) can be corrected by a sixth equation shown below.

$$VOUT = VIN \times \left(1 + \frac{R12}{R11}\right) = 1.01 VIN \times \left(1 + \frac{R12}{R1'}\right) \quad \text{[Eq. 6]}$$

$$\left(1 + \frac{R12}{R11}\right) = 1.01 \times \left(1 + \frac{R12}{R1'}\right)$$
$$R1' = \frac{101 \times 5}{499} R11$$
$$6 = \left(1 + \frac{R12}{R11}\right) = \left(1 + \frac{5R11}{R11}\right) = 1.01\left(1 + \frac{R12}{R1'}\right)$$
$$= 1.01\left(1 + \frac{5 \times R11}{\frac{101 \times 5}{499} \times R11}\right)$$

Therefore, in accordance with the present invention, a regulation operation can be correctly performed without help of a reference voltage. Accordingly, since a stable output voltage can be obtained even though an unstable voltage is inputted, an additional reference voltage circuit is not required in a semiconductor device. Further, since a stable regulator output voltage can be generated, a system can be stably operated using an internal power supply voltage.

The present application contains subject matter related to Korean patent application No. 2005-52370, filed in the Korean Patent Office on Jun. 17, 2005, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A regulator, comprising:
a digital voltage detection unit for generating a digital voltage detection signal by detecting a digital value of a voltage level of an input voltage;
a variable gain amplifying unit for amplifying the input voltage in an amplifying ratio according to a gain control signal; and
a gain control unit for receiving the digital voltage detection signal to thereby generate the gain control signal, wherein
the gain control unit is a digital operational unit for comparing the digital voltage detection signal with a target value to thereby adjust a gain value of the variable gain amplifying unit so that the target value can be obtained by applying the gain value to the digital voltage detection signal.

2. The regulator as recited in claim 1, wherein the variable gain amplifying unit includes:
an operational amplifier for receiving the input voltage through an inversion input terminal;
a first variable resistor whose one terminal and the other terminal are coupled to a non-inversion input terminal of the operational amplifier and a ground voltage respectively; and
a second variable resistor whose one terminal and the other terminal are coupled to the non-inversion input terminal of the operational amplifier and an output terminal of the operational amplifier.

3. The regulator as recited in claim 2, wherein the variable gain amplifying unit further includes a unit gain operational amplifier for buffering an output of the operational amplifier.

4. The regulator as recited in claim 1, wherein the variable gain amplifying unit includes:
an operational amplifier for receiving the input voltage through an inversion input terminal;

a variable resistor whose one terminal and the other terminal are coupled to a non-inversion input terminal of the operational amplifier and a ground voltage respectively; and a fixed resistor whose one terminal and the other terminal are coupled to the non-inversion input terminal of the operational amplifier and an output terminal of the operational amplifier.

5. The regulator as recited in claim 1, wherein the variable gain amplifying unit includes:

an operational amplifier for receiving the input voltage through an inversion input terminal;

a fixed resistor whose one terminal and the other terminal are coupled to a non-inversion input terminal of the operational amplifier and a ground voltage respectively; and a variable resistor whose one terminal and the other terminal are coupled to the non-inversion input terminal of the operational amplifier and an output terminal of the operational amplifier.

6. The regulator as recited in claim 1, wherein the digital voltage detection unit includes:

a counter for counting a predetermined operational clock;

a voltage detector for comparing the input voltage with a comparison voltage which increases in proportion to a counted number of the counter to thereby output a comparison result as a logic value; and a serial input parallel output (SIPO) block for receiving an output logic value stream which is a serial digital data outputted as the comparison result from the voltage detector to thereby generate the digital voltage detection signal which is a parallel digital data.

* * * * *